W. E. SCHILLING.
VEHICLE WHEEL.
APPLICATION FILED JUNE 12, 1911.

1,056,591.

Patented Mar. 18, 1913.

WITNESSES:
R. E. Hamilton.
E. B. House.

INVENTOR.
William E. Schilling
BY
Warren D. House
His ATTORNEY.

UNITED STATES PATENT OFFICE.

WILLIAM E. SCHILLING, OF KANSAS CITY, MISSOURI.

VEHICLE-WHEEL.

1,056,591. Specification of Letters Patent. Patented Mar. 18, 1913.

Application filed June 12, 1911. Serial No. 632,666.

*To all whom it may concern:*

Be it known that I, WILLIAM E. SCHILLING, a citizen of the United States, residing at Kansas City, in the county of Jackson and State of Missouri, have invented certain new and useful Improvements in Vehicle-Wheels, of which the following is a specification.

My invention relates to improvements in vehicle wheels.

The object of my invention is to provide novel means by which the outer casing of a pneumatic tire may be quickly and securely fastened to the rim of a wheel.

My invention is particularly well adapted for use in connection with rims and tires of the "clencher" type.

The novel features of my invention are hereinafter fully described and claimed.

Figure 1:
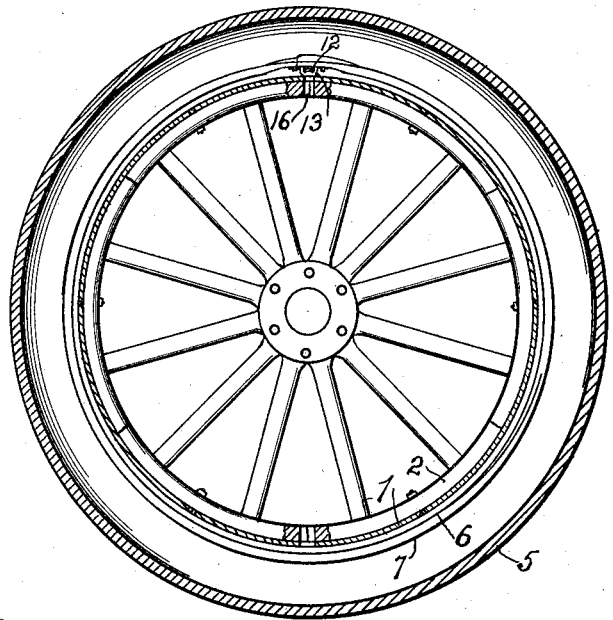
Figure 2:
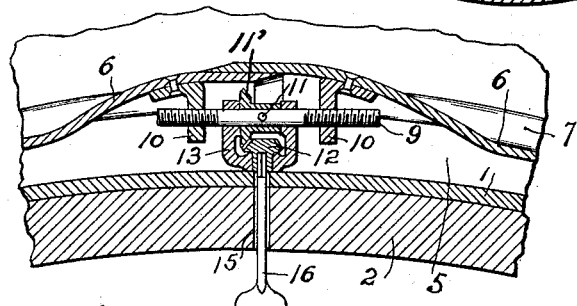
Figure 4:
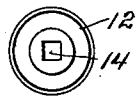
Figure 3:
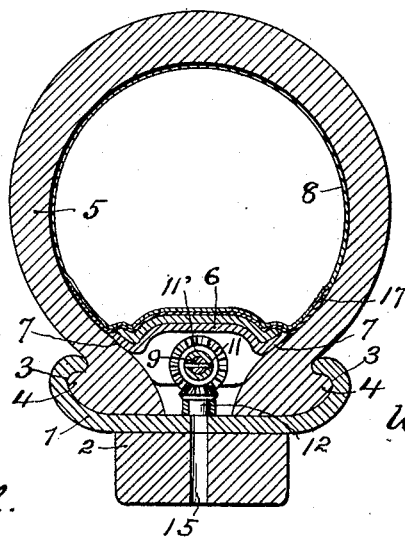

In the accompanying drawings, which illustrate the preferred form of my invention, Figure 1 is a vertical sectional view of a wheel provided with my improved tire securing mechanism. Fig. 2 is an enlarged fragmental vertical sectional view of a portion of a wheel and the securing mechanism, the key for turning the adjusting screw being shown in its operative position. Fig. 3 is a cross section on the dotted line *a—b* of Fig. 2, the key being removed. Fig. 4 is an end view of the pinion with which the setting key engages.

Similar reference characters designate similar parts.

1 designates a clencher rim secured in any desired manner to the wheel felly 2, and provided with the usual annular oppositely disposed grooves 3, which are adapted to receive corresponding annular flanges 4 with which the outer casing 5 of an ordinary pneumatic tire is provided.

For firmly securing the casing 5 engaged with the rim 1, I preferably provide a transversely divided ring 6 which is located inside the casing 5 and is provided, preferably with outwardly flaring edge portions 7 which are adapted to respectively bear against the inner sides of the opposite walls of the casing 5, as is best shown in Fig. 3. Preferably the ends of the divided ring 6 overlap each other, as shown in Fig. 2, so that no portion of the inner inflatable tube 8 of the tire can, when inflated, pass between the ends of the ring 6. In order that the ring 6 may be contracted so as to tightly clamp the opposite sides of the casing 5 in their proper positions, any suitable means may be employed. For this purpose I have shown a form of mechanism which is well adapted for the purpose. This mechanism comprises a longitudinally disposed rod 9 the opposite ends of which are reversely screw threaded and respectively fitted in threaded holes provided in two brackets 10, which are respectively secured to the inner side of the ring 6, at opposite sides of the place of division of said ring.

When the rod 9 is turned in the proper direction the ring 6 will be contracted. In order to turn the rod 9, said rod has secured to it by a transverse pin 11 a bevel pinion 11' which meshes with another bevel pinion 12, the hub of which is disposed radially, said hub being rotatively mounted in a hole provided in a yoke 13, preferably of U form and having its arms provided with transverse holes in which the rod 9 is rotatably mounted.

The hub of the pinion 12 is preferably provided with an axial square hole 14 which is disposed opposite a radial hole 15 which extends through the rim 1 and adjacent felly 2.

A turning key 16 having a square end adapted to be removably fitted in the hole 14 of the pinion 12 is provided. By inserting the key 16 through the hole 15 and into the hole 14 and turning the key, the ring 6 may be contracted or expanded as desired, through the intermediacy of the pinions 11' and 12, rod 9 and brackets 10.

The outwardly flaring edge portions 7 of the ring 6 form a kind of annular wedge by which, when the ring 6 is contracted, the opposite walls of the casing 5 will be clamped tightly against the outer periphery of the rim 1 and at the same time forced laterally into secure engagement with the grooved portions 3 of the rim 1.

As additional protection to the inner tube 8, there may be placed between it and the ring 6 a strip of flexible material, 17, such as canvas or rubber, and which extends laterally over the edges of the ring 6.

The clamping ring 6 is inserted into the position which it is to occupy in the casing 5 before the tire is inflated. The key 16 is then applied to the pinion 12 so as to tightly clamp the casing 5 to the rim 1. The key 16 is then removed and the inner tube inflated in the usual manner.

With the use of my invention there is no liability of the tire slipping or becoming detached from the rim, even if the tire becomes deflated, and pinching of the inner tube is obviated.

I do not limit my invention to the structure illustrated and described, as many modifications of my invention, within the scope of the appended claims, may be made without departing from its spirit.

Having thus described my invention, what I claim and desire to secure by Letters Patent, is:—

1. In a vehicle wheel, the combination with a wheel rim, of a contractible transversely divided ring encircling the rim, opposite ends of which are provided respectively with inwardly extending brackets each having a transverse screw threaded hole, a rod having oppositely threaded portions respectively fitted in said threaded holes, a pinion secured to and rotatable with said rod, a yoke having two arms disposed at opposite ends of said pinion, said arms having holes therethrough in which said rod is rotatively mounted, and a second pinion meshing with the first named pinion and rotatively mounted in said yoke.

2. In a vehicle wheel, the combination with a wheel rim, of a contractible transversely divided ring encircling the rim, opposite ends of the ring being provided respectively with inwardly extending brackets each having a transverse screw threaded hole, a rod having oppositely threaded portions respectively fitted in said threaded holes, a pinion secured to and rotatable with said rod, a yoke having two arms disposed at opposite ends of said pinion, said arms having holes therethrough in which said rod is rotatively mounted, and a second pinion meshing with the first named pinion and having a radial hub rotatively mounted in said yoke, the rim having a radial hole disposed in alinement with the axis of said hub.

In testimony whereof I have signed my name to this specification in presence of two subscribing witnesses.

WILLIAM E. SCHILLING.

Witnesses:
E. B. HOUSE,
FLORENCE M. VENDIG.

---

Copies of this patent may be obtained for five cents each, by addressing the "Commissioner of Patents, Washington, D. C."